United States Patent Office 3,533,993
Patented Oct. 13, 1970

3,533,993
VINYL CHLORIDE RESINS STABILIZED WITH
2 - MERCAPTOPYRIDINE - 1 - OXIDE AND
DERIVATIVES
Almon G. Hovey, Northford, and Ehrenfried H. Kober, Hamden, Conn., assignors to Olin Mathieson Chemical Corporation, a corporation of Virginia
No Drawing. Filed June 18, 1968, Ser. No. 737,818
Int. Cl. C08f 45/60, 45/62
U.S. Cl. 260—45.75
6 Claims

ABSTRACT OF THE DISCLOSURE

Vinyl chloride resins are protected against thermal degradation by the addition of a stabilizing amount of 2-mercaptopyridine-1-oxide or selected derivatives thereof.

This invention relates to a method for stabilizing vinyl chloride resins and to vinyl chloride compositions containing selected stabilizing compounds. More particularly, this invention relates to the use of 2-mercaptopyridine-1-oxide and certain derivatives thereof to inhibit thermal degradation of vinyl chloride resins.

Synthetic resins of vinyl chloride will partially decompose and discolor when subjected to heat, for example, during molding and fabricating operations, or upon extended storage at elevated temperatures. While discoloration can be tolerated in deeply pigmented resins, it presents serious problems in the manufacture and handling of transparent, translucent and lightly colored vinyl chlorides. Furthermore, such resins are often subject to undesirable growths due to the action of bacteria.

Various heat stabilizers for vinyl chloride resins have been previously disclosed in the art. Thus, U.S. Pat. 2,888,435 discloses certain substituted tin mercaptide stabilizers, which are effective for this application. However, while providing the desired thermal stabilization, such compounds do not protect the resin from bacterial growth.

2-mercaptopyridine-1-oxide and a wide variety of derivatives thereof have similarly been reported in the literature; these compounds have been disclosed to be excellent biocides for various applications.

Now it has been found in accordance with this invention that 2-mercaptopyridine-1-oxide and selected derivatives thereof are excellent heat stabilizers for vinyl chloride resins. Furthermore, the use of these selected compounds in critical proportions as more fully defined hereinafter confers an additional benefit of mildewcidal action on the vinyl chloride compositions. This dual function in accordance with this invention provides economic and processing advantages in manufacturing vinyl chloride materials in that the use of two different materials to provide mildewcidal action and thermal stabilization, with the attendant problems of chemical interaction, is avoided.

The vinyl chloride resins that may be advantageously stabilized in accordance with this invention include polyvinyl chloride, and the copolymers of vinyl chloride and other polymerizable mono-olefinic compounds which are compatible with the vinyl chloride in polymeric form, that is, which form copolymers with vinyl chloride. Illustrative mono-olefinic compounds include vinyl acetate, methyl methacrylate, vinylidene chloride, the aliphatic fumarates, for example dimethyl fumarate and diethyl fumarate, the aliphatic maleates, for example dimethyl maleate and diethyl maleate, and the aliphatic acrylates, for example ethyl acrylate. The vinyl halide copolymers that may be stabilized in accordance with this invention are copolymers of from 50 to 98% of vinyl chloride, and from 2 to 50% of another copolymerizable olefinic compound. Polyvinyl chloride is particularly advantageously stabilized according to the practcie of this invention.

As previously mentioned, 2-mercaptopyridine-1-oxide, which is fully described in U.S. Pat. 2,686,786, is an effective heat stabilizer in accordance with this invention. The derivatives of 2-mercaptopyridine-1-oxide suitable for use herein are sodium and calcium 2-mercaptopyridine-1-oxide, which are also described in U.S. Pat. 2,686,786; the zinc, cadmium and tin, i.e., stannous and stannic, derivatives of 2-mercaptopyridine-1-oxide, as described in U.S. Pat. 2,809,971; stannous chloride bis-(2-pyridyl-1-oxide)disulfide, disclosed in U.S. Pat. 3,027,372; selected organo-tin derivatives of 2-mercaptopyridine-1-oxide; and mixtures of the aforementioned compounds. The organo-tin derivatives of 2-mercaptopyridine-1-oxide have the following general formula:

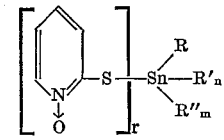

$$\left[ \bigotimes_{\substack{N \\ \downarrow \\ O}} -S- \right]_r Sn \underset{R''_m}{\overset{R}{\underset{R'_n}{\diagup}}} \qquad \text{I}$$

wherein R, R' and R'' are independently selected alkyl, and preferably lower alkyl, i.e., alkyl having 1–4 carbon atoms; and aryl having 6–10 carbon atoms, preferably phenyl; n and m independently are 0–1 and r is 1–2, with the proviso that n plus m plus r is 3. These compounds are fully described in the copending patent application of Charles W. Kaufman, Ser. No. 598,801 filed Nov. 25, 1966, now abandoned, and the application is herewith incorporated in its entirety. Briefly, these organo-tin materials are prepared by reacting an alkali metal salt or ammonium salt of 2-mercaptopyridine-1-oxide with the appropriate organo-substituted tin salt in a solvent system. While any of the organo-tin derivatives represented by Formula I can be suitably employed herein, preferred embodiments of this invention utilize the di(lower alkyl)-, tri(lower alkyl)- and triphenyl-tin compounds. In summary, the preferred compounds used as stabilizing additives for vinyl chloride resin acording to the invention are 2-mercaptopyridine-1-oxide, sodium-2-mercaptopyridine-1-oxide, calcium-2-mercaptopyridine-1-oxide, zinc-2-mercaptopyridine-1-oxide, cadmium-2-mercaptopyridine-1-oxide, tin-2-mercaptopyridine-1-oxide, stannous chloride bis-(2-pyridiyl-1-oxide) disulfide, di(lower alkyl)tin-2-mercaptopyridine-1-oxide, tri(lower akyl) tin-2-mercaptopyridine-1-oxide, triphenyl tin-2-mercaptopyridine-1-oxide, and mixtures thereof.

Generally the heat stabilizers of this invention are added to a plastisol comprising one of the aforementioned vinyl chloride resins and a conventional plasticizer. However, the method of incorporation is not critical, and any conventional procedure can be suitably employed. For example, the stabilizer can be dissolved in a suitable solvent and added to the solid resin prior to fabrication. Alternately, the resin, either in powdered or fabricated form, can be sprayed with a solution or suspension of the heat stabilizer according to known techniques.

The stabilizers of this invention are employed in an amount between about 125 and 1,000 p.p.m., and preferably between about 400 and 600 p.p.m. Higher proportions, for example up to and greater than 2,500 p.p.m., can be employed, but generally no additional benefit is recognized by the use of such proportions. Where the concentration of stabilizer in the claims and specification herein is set forth in p.p.m., such concentration is based on the weight of the vinyl chloride resin.

The efficacy of the selected heat stabilizers of this invention is particularly surprising and unexpected in view of the fact that a variety of other closely related derivatives of 2-mercaptopyridine-1-oxide have been found to be ineffective in this application. Thus, as will be apparent from the examples, the barium, strontium and aluminum derivatives of 2-mercaptopyridine-1-oxide do not produce a stabilizing effect upon vinyl chloride resins. In view of the fact that barium and strontium are in the same group in the Periodic Table as, for example, calcium, it is particularly surprising that the latter derivative is effective in this application while the former are not. Furthermore, certain derivatives of the analogus 2-hydroxypyridine-1-oxide have been found to be ineffective as heat stabilizers for vinyl chloride resins, thereby substantiating the selectivity of the compounds suitable for use herein.

The stabilized vinyl chloride compositions of this invention may be used for the production of various fabricated structures such as film, sheets, bars, rods, etc., in accordance with known techniques. Furthermore, conventional additives such as fillers, light-colored pigments and the like may be added to the compositions prior to fabrication into the desired end product.

The following examples will serve to illustrate the practice of this invention. All parts and percentages are by weight unless otherwise specified.

were cast in aluminum dishes and converted to solid elastomers by heating in an oven for various periods at specified temperatures.

After observing the color of the cured elastomers, mildewcide evalution was porformed in the following manner: 1¼ inch squares of elastomer were cut and placed in the center of culture dishes containing 19 cc. of agar and inoculated with a broth containing a fresh 7 day old culture of Pullularia pullans. In accordance with conventional bacteriological procedures, each dish received the same quantity of spores. The specimens were kept in a high humidity environmental room maintained at 75° F., 81% relative humidity and examined at intervals for organism growth.

The following table shows data for plastisols comprising 42.8 parts dioctyl phthalate and 58.2 parts polyvinyl chloride, which were cured for 30 minutes at 180° C.

The following tables indicate the performance of these compositions:

TABLE I

| Example | 2-mercaptopyridine-1-oxide derivative | Color | Mildewcide evaluation | | | |
|---|---|---|---|---|---|---|
| | | | 1 week | 2 weeks | 3 weeks | 4 weeks |
| Control | None | Dark brown | Black and green mold on agar | Black and green mold heavy. | Agar completely overgrown. | Starting growth on plastic. |
| 1 | Tin (II) | Lighter brown than control. | I | I | I | I. |
| 2 | Stannous chloride bis-(2-pyridyl-1-oxide)disulfide. | do | I | I | I | I. |

EXAMPLES

Various plastisols were made by grinding 1000 p.p.m. (based on total plastisol weight) of the indicated stabilizer in a porcelain mortar, adding slowly, with thorough mixing, the appropriate plasticizer, and then blending into the stabilizer-plasticizer dispersion Goodrich Pliovic WO-2, a plastisol grade polyvinyl chloride. The plastisols Data for plastisols based on 50 parts polyvinyl chloride and 50 parts epoxidized soyean oil having an oxirane content of approximately 6.04% are set forth herein. The plastisols were cured by heating at 175° C.

TABLE II

| Example | 2-mercaptopyridine-1-oxide derivative | Color | Mildewcide evaluation | | | |
|---|---|---|---|---|---|---|
| | | | 1 week | 2 weeks | 3 weeks | 4 weeks |
| Control | None | Dark orange to amber. | Agar completely overgrown over edges. | Creeping up edges of plastic. | Appears to be starting growth on plastic. | Starting growth on plastic. |
| 3 | Sodium | Light orange | I | I | I | I. |
| 4 | Zinc | Water white transparent. | I | I | I | I. |
| 5 | Triphenyl tin | Light yellow to orange. | ⅛" I.Z. | 3/32" I.Z. | Invasion of previous I.Z. starting. | Definite invasion of previous I.Z. |
| 6 | Stannous chloride bis-(2-pyridyl-1-oxide)disulfide. | Light orange | ¼" to 0 I.Z. | I.Z. on 2 sides only. | Same as at 2 weeks. | Pullularia all over agar; white over one corner of sample. |
| 7 | Tin (IV) | Light orange | ¾" to 0 I.Z. | Irreg. I.Z. | Smaller I.Z. | Agar completely covered; none on sample. |
| 8 | Tributyl tin | Slight yellowing | ⅝" I.Z. | ¼" to ½" I.Z. | ⅜" to ½" I.Z. | ⅜" to ½" I.Z. |
| 9 | Tin (II) | Medium orange | ⅛" I.Z. | Very small I.Z. | Agar covered | Agar covered; edges covered; none on sample. |
| 10 | Dibutyl tin | Light yellow | ⅝" I.Z. | ⅜" to ⅝" I.Z. | I.Z. getting smaller. | Large ½" I.Z. on 2 sides. |

The following table shows data for plastisols having the same base ingredients in the same proportions as those reported in Table II. Curing was effected by heating at 180° C. for 40 minutes.

TABLE III

| Example | 2-mercaptopyridine-1-oxide derivative | Color | Mildewcide Evaluation | | | |
|---|---|---|---|---|---|---|
| | | | 1 week | 2 weeks | 3 weeks | 4 weeks |
| Control | None | Deep orange | Agar 100% covered- starting over top of sample. | Creeping up over edges. | Appears to be starting growth on plastic. | Definite though slight growth on top of sample. |
| 11 | Zinc | Very light yellow | ⅝" to ¾" I.Z. | About 30% Agar-covered along outer perimeter. | Very large I.Z. | ½" to ¾" I.Z. |
| 12 | Tin (IV) | Medium orange | Less than ⅛" I.Z. | Very small I.Z. | Very small I.Z. | Very small I.Z. on one side only. |
| 13 | Tributyl tin | Medium yellow | ⅜" to ½" I.Z. | ⅜" to ½" I.Z. all around sample. | ⅜" to ½" I.Z. all around sample | ⅜" to ½" I.Z. all around sample. |
| 14 | Dibutyl tin | do | ⅛" to ⅜" I.Z. | Definite ⅛" I.Z. | ⅛" I.Z. | 1/16" to ⅛" I.Z. on 2 sides. |

Data for plastisols formulated as described in Tables II and III and cured at 200° C. for 10 minutes is reported herein. Comparative Examples 1–3 indicate the ineffectiveness of related 2-mercaptopyridine-1-oxide derivatives in the process of this invention.

TABLE IV

| Example | 2-mercaptopyridine-1-oxide derivative | Mildewcide evaluation | |
|---|---|---|---|
| | | Color | 3 Days |
| Control | None | Definite yellow orange tint | V.E. |
| C-1 | Aluminum | do | Very large I.Z. |
| C-2 | Barium | do | Complete inhibition. |
| C-3 | Strontium | do | Do. |
| 15 | 2-mercaptopyridine-1-oxide | Slight yellow | V.E. |
| 16 | Zinc | Water white, transparent | V.E. |
| 17 | Calcium | Almost water white | Almost complete inhibition. |

The following table reports data for plastisols formulated as in Tables II–IV and cured at 200° C. for 30 minutes. Examples employing the barium, strontium and aluminum derivatives of 2-mercaptopyridine-1-oxide are included or comparison.

TABLE V

| Example | 2-mercaptopyridine-1-oxide derivative | Mildewcide evaluation | |
|---|---|---|---|
| | | Color | 3 Days |
| Control | None | Cherry red brown | V.E. |
| C-4 | Barium | Deep orange | Large I.Z.; Agar 20% covered. |
| C-5 | Strontium | do | Complete inhibition. |
| C-6 | Aluminum | do | ⅛" I.Z. |
| 18 | Cadmium | Very light yellow | Very small I.Z. |
| 19 | Zinc | do | V.E. |
| 20 | Calcium | Light yellow | GAOA. |

For purposes of further comparison, various salts of 2-hydroxypyridine-1-oxide were tested as heat stabilizers for polyvinyl chloride resins, employing the same formulations as in Tables II–V, and curing at 200° C. for 30 minutes. As will be apparent from the following table, these salts were ineffective in this application.

TABLE VI

| Example | 2-hydroxypyridine-1-oxide derivative | Mildewcide evaluation | |
|---|---|---|---|
| | | Color | 3 Days |
| Control | None | Cherry red brown | V.E. |
| C-7 | Barium | Very deep orange | V.E. |
| C-8 | Aluminum | Very deep orange to brown | V.E. |
| C-9 | Strontium | Deep orange | Complete growth on sample. |

NOTE.—In the above tables: I=Complete inhibition; IZ=Inhibition zone; VE=Growth starting up edge of plastic; GAOA=Growth all over agar—no I.Z.

What is claimed is:
1. A composition comprising:
(a) a vinyl chloride resin and
(b) a stabilizing amount of a compound selected from the group consisting of 2-mercaptopyridine-1-oxide, sodium - 2 - mercaptopyridine - 1 - oxide, calcium-2-mercaptopyridine-1-oxide, zinc-2-mercaptopyridine-1-oxide, cadmium-2-mercaptopyridine-1-oxide, tin-2-mercaptopyridine-1-oxide, stannous chloride bis-(2-pyridyl - 1 - oxide) disulfide, di(lower alkyl)tin-2-mercaptopyridine - 1 - oxide, tri(lower alkyl) tin-2-mercaptopyridine-1-oxide, triphenyl tin-2-mercaptopyridine-1-oxide, and mixtures thereof.

2. The composition of claim 1 in which said stabilizing amount ranges from about 125 to about 2500 parts per one million parts by weight of said vinyl chloride resin.

3. The composition of claim 1 wherein said compound is sodium-2-mercaptopyridine-1-oxide.

4. The composition of claim 1 wherein said compound is stannous chloride bis-(2-pyridyl-1-oxide)disulfide.

5. The composition of claim 1 wherein said compound is di(lower alkyl) tin-2-mercaptopyridine-1-oxide.

6. The composition of claim 1 wherein said compound is tri(lower alkyl) tin-2-mercaptopyridine-1-oxide.

References Cited

UNITED STATES PATENTS

| | | | |
|---|---|---|---|
| 2,564,646 | 8/1951 | Leistner et al. | 260—45.7 |
| 2,632,747 | 3/1953 | Darby | 260—23 |
| 2,809,971 | 10/1957 | Bernstein et al. | 260—270 |
| 3,096,183 | 7/1963 | Genth | 106—15 |
| 3,154,518 | 10/1964 | Gradsten et al. | 260—45.9 |
| 3,214,453 | 10/1965 | Stern | 260—429.7 |
| 3,288,669 | 11/1966 | Hechenbleikner | 167—22 |
| 3,308,082 | 3/1967 | Pauli et al. | 260—29.5 |
| 3,321,480 | 5/1967 | Schroder et al. | 260—270 |

DONALD E. CZAJA, Primary Examiner

R. A. WHITE, Assistant Examiner

U.S. Cl. X.R.

260—45.8; 424—78